United States Patent
Shirakawa et al.

(10) Patent No.: US 7,431,911 B2
(45) Date of Patent: Oct. 7, 2008

(54) BARIUM TITANATE AND PRODUCTION AND PROCESS THEREOF

(75) Inventors: Akihiko Shirakawa, Chiba (JP); Hitoshi Yokouchi, Chiba (JP)

(73) Assignee: Showa Denko K.K., Tokyo (JP)

( * ) Notice: Subject to any disclaimer, the term of this patent is extended or adjusted under 35 U.S.C. 154(b) by 309 days.

(21) Appl. No.: 10/189,371

(22) Filed: Jul. 3, 2002

(65) Prior Publication Data

US 2003/0044347 A1  Mar. 6, 2003

Related U.S. Application Data

(60) Provisional application No. 60/303,795, filed on Jul. 10, 2001.

(30) Foreign Application Priority Data

Jul. 4, 2001  (JP) ............................. 2001-203299

(51) Int. Cl.
 C01G 23/00  (2006.01)
 H01G 4/12  (2006.01)
 C04B 35/46  (2006.01)

(52) U.S. Cl. ....................... 423/598; 501/137; 361/311; 361/312; 361/321.1

(58) Field of Classification Search ................ 423/598; 501/137; 428/210; 361/311, 312, 321.1
 See application file for complete search history.

(56) References Cited

U.S. PATENT DOCUMENTS

| 5,445,806 A | 8/1995 | Kinugasa et al. | |
|---|---|---|---|
| 2002/0048547 A1* | 4/2002 | Lee et al. ...................... | 423/598 |
| 2003/0012727 A1* | 1/2003 | Yoshikawa et al. .......... | 423/598 |

FOREIGN PATENT DOCUMENTS

| EP | 1148030 A | 10/2001 |
|---|---|---|
| JP | 3-39014 B | 6/1991 |
| JP | 5-58605 A | 3/1993 |
| JP | 5-58629 A | 3/1993 |
| JP | H06-012917 A | 1/1994 |
| JP | 7-291607 A | 11/1995 |
| JP | 11-043327 A | 2/1999 |
| JP | 11-273986 A | 10/1999 |
| JP | 2001-031471 A | 2/2001 |
| JP | 2002-167281 A | 6/2002 |
| WO | 91/02697 A1 | 3/1991 |
| WO | WO99/58451 A | 11/1999 |
| WO | WO 00/35811 A | 6/2000 |

OTHER PUBLICATIONS

Translation of Argument filed in support of a Submission of Information on May 14, 2004 in Japanese Patent Application No. 2003-510394.*
Machine translation of Japan 2001-031471, Feb. 6, 2001.*
Translation of Japan 06-012917, Jan. 21, 1994.*
Patent Abstracts of Japan, abstracting JP-A-7-291607 of Nov. 7, 1995.
Patent Abstracts of Japan, abstracting JP-A-5-58605 of Mar. 9, 1993.
Patent Abstracts of Japan, abstracting JP-A-5-58629 of Mar. 9, 1993.
Patent Abstracts of Japan, abstracting JP-59-39726A of Mar. 5, 1984 corresponding to JP-B-39014 of Jun. 12, 1991.
Patent Abstracts of Japan, abstracting JP-A-11-043327, Feb. 16, 1999.
Uchino, Kenji et al, *Dependence of the Crystal Structure on Particle Size in Barium Titanate*, J. Am. Ceram. Soc., vol. 72, pp. 1555-1558, Aug. 1989.
Patent Abstracts of Japan, abstracting JP-A-06-012917 of Feb. 21, 1994.
Beginner's Books 16 "Basic Powder Technology", Kogyo Chosaki, Nov. 15, 2000, pp. 24-25.
Ceramic Experimintation Manual, Nikkan Kobyou Shimbunsya, Oct. 30, 1989, pp. 21-22.
Ceramic Notebook, Gihodo Syuppan, Mar. 20, 1986, pp. 548-549.
Argument filed in support of a Submission of Information on May 14, 2004 in Japanese Patent Application No. 2003-510394.

* cited by examiner

*Primary Examiner*—Steven Bos
(74) *Attorney, Agent, or Firm*—Sughrue Mion, PLLC

(57) ABSTRACT

The present invention provides a barium titanate having a small particle size, containing small amounts of unwanted impurities, and exhibiting excellent electric characteristics, which can be employed for forming a dielectric ceramic thin film required for a small-sized capacitor which enables production of a small-sized electronic apparatus; and a process for producing the barium titanate. When a titanium oxide sol is reacted with a barium compound in an alkaline solution containing a basic compound, the basic compound is removed in the form of gas after completion of reaction, and the resultant reaction mixture is fired, a barium titanate having a large BET specific surface area and a high tetragonality content is produced.

16 Claims, No Drawings

BARIUM TITANATE AND PRODUCTION AND PROCESS THEREOF

CROSS REFERENCE TO RELATED APPLICATION

The present application is filed under 35 U.S.C. §111(a), and claims the benefits, pursuant to 35 U.S.C. §119(e)(1), of the filing date of Provisional Application No. 60/303,795 filed 10 Jul. 2001 pursuant to 35 U.S.C. §111(b).

TECHNICAL FIELD

The present invention relates to a barium titanate employed in, for example, dielectric materials, multi-layer ceramic capacitors, and piezoelectric materials, and to a process for producing the barium titanate; and more particularly to a barium titanate having a fine structure and a high tetragonality content, and to a process for producing the barium titanate.

BACKGROUND ART

Barium titanate has been widely employed as a functional material in, among others, dielectric materials, multi-layer ceramic capacitors, and piezoelectric materials. Electronic parts of small size and light weight have been developed, and in accordance with this trend, demand has arisen for development of a process for producing barium titanate having smaller particle size and exhibiting excellent electric characteristics, such as high dielectric constant.

Barium titanate having high tetragonality content is known to have high dielectric constant, but so far, attempts to reduce the particle size of such barium titanate to a desired level have failed, whereas in the case of barium titanate having small particle size, the tetragonality content thereof has failed to be increased, and thus the dielectric constant of such barium titanate cannot be increased satisfactorily.

Examples of processes for producing titanium-containing composite oxide particles such as barium titanate include a solid-phase process in which powders of an oxide and a carbonate, serving as raw materials, are mixed in, for example, a ball mill, and the resultant mixture is allowed to react at a temperature as high as about 800° C. or higher, to thereby produce a product; an oxalate process in which an oxalic acid composite salt is prepared, and the composite salt is thermally decomposed, to thereby produce titanium-containing composite oxide particles; an alkoxide process in which a metal alkoxide serving as a raw material is subjected to hydrolysis, to thereby yield a precursor; a hydrothermal synthesis process in which a raw material is allowed to react in an aqueous solvent at high temperature and high pressure, to thereby yield a precursor; a process in which a product obtained through hydrolysis of a titanium compound is reacted with a water-soluble barium salt in a strong alkaline aqueous solution (Japanese Patent No. 1841875); and a process in which a titanium oxide sol is reacted with a barium compound in an alkaline aqueous solution (International Patent Publication WO00/35811).

Although the solid-phase process attains low production cost, titanium-containing composite oxide particles produced through the process have a large particle size, and the particles are unsuitable for use as a functional material such as a dielectric material or a piezoelectric material. When the thus-produced particles are subjected to grinding to thereby form fine particles, strain occurs in the resultant fine particles. Therefore, barium titanate having high tetragonality content; i.e., barium titanate having high dielectric constant, fails to be produced.

The oxalate process enables production of particles having a particle size smaller than that of particles produced through the solid-phase process. However, particles produced through the oxalate process contain a carbonate group derived from oxalic acid. Therefore, the oxalate process cannot produce barium titanate exhibiting excellent electric characteristics.

The alkoxide process and the hydrothermal synthesis process enable production of barium titanate having a very small particle size. However, the thus-produced barium titanate contains a large amount of a hydroxyl group derived from water. Therefore, the barium titanate fails to exhibit excellent electric characteristics. Barium titanate produced through the alkoxide process contains a carbonate group.

Since the hydrothermal synthesis process is carried out at high temperature and high pressure, the process requires exclusive equipment, and thus production cost increases.

The processes disclosed in Japanese Patent No. 1841875 and International Patent Publication WO00/35811 employ potassium hydroxide or sodium hydroxide as an alkali. Therefore, the processes require a step of removing such an alkali after completion of reaction. Since barium elutes and a hydroxyl group enters the resultant barium titanate during the removal step, the barium titanate fails to have high tetragonality content.

The present invention contemplates provision of a barium titanate having a small particle size, containing small amounts of unwanted impurities, and exhibiting excellent electric characteristics, which can be employed for forming a dielectric ceramic thin film required for a small-sized capacitor which enables production of a small-sized electronic apparatus; and a process for producing the barium titanate.

DISCLOSURE OF THE INVENTION

As a result of extensive investigations aimed at solving the aforementioned problems, the present inventors have found that, when a titanium oxide sol is reacted with a barium compound in an alkaline solution containing a basic compound, the basic compound is removed in the form of gas after completion of reaction, and the resultant reaction mixture is fired, there can be produced barium titanate having a large BET specific surface area and a high tetragonality content, which cannot be produced through a conventional production process. The present invention has been accomplished on the basis of this finding.

Accordingly, the present invention provides the following.

(1) A barium titanate comprising at least one element selected from the group consisting of Sn, Zr, Ca, Sr, Pb, La, Ce, Mg, Bi, Ni, Al, Si, Zn, B, Nb, W, Mn, Fe, Cu, and Dy, said at least one element being in an amount of less than about 5 mol % (inclusive of 0 mol %) on the basis of the entirety of $BaTiO_3$, wherein BET specific surface area x (unit: $m^2/g$), and the ratio y of the c-axis length (unit: nm) of a crystal unit lattice to the a-axis length (unit: nm) of the crystal unit lattice as measured by means of a Rietveld method satisfy the following relations:

y=c-axis length/a-axis length $y \geq 1.011 - 8.8 \times 10^{-6} \times x^3$ (wherein x is greater than about 0.1 and not more than 9.7)

$y \geq 1.003$ (x>9.7).

(2) A barium titanate according to (1) above, which is in the form of powder.

(3) A process for producing a barium titanate as recited in (1) or (2) above, comprising reacting a titanium oxide sol with a barium compound in an alkaline solution containing a basic compound, the process comprising a step of reacting the titanium oxide sol with the barium compound while the concentration of a carbonate group contained in the resultant reaction mixture is maintained at about 500 mass ppm or less as reduced to $CO_2$; a step of removing the basic compound in the form of gas after completion of reaction; and a step of firing the resultant reaction mixture.

(4) A process for producing a barium titanate according to (3) above, wherein the titanium oxide sol is produced through hydrolysis of a titanium compound under acidic conditions.

(5) A process for producing a barium titanate according to (3) or (4) above, wherein the titanium oxide sol contains brookite-type crystals.

(6) A process for producing a barium titanate according to any one of (3) through (5) above, wherein the basic compound is a substance which can be gasified through evaporation, sublimation, and/or thermal decomposition at a temperature at which firing is performed or lower and at atmospheric pressure or reduced pressure.

(7) A process for producing a barium titanate according to (6) above, wherein the basic compound is an organic base.

(8) A process for producing a barium titanate according to any one of (3) through (7) above, wherein the alkaline solution has a pH of about 11 or more.

(9) A process for producing a barium titanate according to any one of (3) through (8) above, wherein the step of removing the basic compound in the form of gas is carried out at a temperature falling within a range of room temperature to a temperature at which firing is performed and at atmospheric pressure or reduced pressure.

(10) A process for producing a barium titanate according to any one of (3) through (8) above, wherein the firing step includes the step of removing the basic compound in the form of gas.

(11) A process for producing a barium titanate according to any one of (3) through (10) above, wherein the firing step is carried out at about 300 to about 1,200° C.

(12) A process for producing a barium titanate according to any one of (3) through (11) above, wherein the reaction mixture of the titanium oxide sol and the barium compound contains a compound of at least one element selected from the group consisting of Sn, Zr, Ca, Sr, Pb, La, Ce, Mg, Bi, Ni, Al, Si, Zn, B, Nb, W, Mn, Fe, Cu, and Dy.

(13) A dielectric ceramic comprising a barium titanate as recited in (1) or (2) above.

(14) A capacitor comprising a dielectric ceramic as recited in (13) above.

MODE FOR CARRYING OUT THE INVENTION

The present invention will next be described in detail.

A characteristic feature of the barium titanate of the present invention resides in that the BET specific surface area x (unit: $m^2/g$), and the ratio y of the c-axis length (unit: nm) of a crystal unit lattice to the a-axis length (unit: nm) of the crystal unit lattice as measured by means of a Rietveld method satisfy the following relations:

y=c-axis length/a-axis length $y \geq 1.011 - 8.8 \times 10^{-6} \times x^3$ (wherein x is greater than about 0.1 and not more than 9.7)

$y \geq 1.003$ (x>9.7).

The barium titanate of the present invention; i.e., $BaTiO_3$, is one type of perovskite-type compound represented by the formula $ABO_3$, wherein A is Ba and B is Ti. The barium titanate may contain at least one element selected from the group consisting of Sn, Zr, Ca, Sr, Pb, La, Ce, Mg, Bi, Ni, Al, Si, Zn, B, Nb, W, Mn, Fe, Cu, and Dy, said at least one element being in an amount of less than about 5 mol % on the basis of the entirety of $BaTiO_3$.

When the ratio of the c-axis length (hereinafter may be abbreviated as "c") to the a-axis length (hereinafter may be abbreviated as "a"); i.e., c/a (i.e., the aforementioned ratio y), is high, the tetragonality content becomes high, and thus the dielectric constant becomes high.

The barium titanate of the present invention has a small particle size, has a high electric constant, and exhibits excellent electric characteristics. Therefore, a small-sized electronic part such as a multi-layer ceramic capacitor is produced from a dielectric material containing the barium titanate, such as a dielectric ceramic material. Furthermore, an electronic apparatus of small size and a light weight can be produced from such an electronic part.

In general, barium titanate having a BET specific surface area of less than about 0.1 $m^2/g$; i.e., barium titanate having a very large particle size, is not effective for producing a small-sized electronic apparatus. In contrast, barium titanate having a BET specific surface area of more than about 0.1 $m^2/g$ and less than about 9.7 $m^2/g$ and satisfying the following relations is effective for producing a small-sized electronic apparatus: $y \geq 1.011 - 8.8 \times 10^{-6} \times x^3$ (wherein y represents the c/a ratio, and x represents the BET specific surface area (unit: $m^2/g$)). In addition, barium titanate having a BET specific surface area of more than about 9.7 $m^2/g$ and a c/a ratio of more than about 1.003 is effective for producing a small-sized electronic apparatus, since a powder satisfying the following relation: $y \geq 1.011 - 8.8 \times 10^{-6} \times x^3$ is obtained when the barium titanate is subjected to heat treatment.

The production process of the present invention will next be described.

No particular limitation is imposed on the titanium oxide sol employed in the present invention, but a titanium oxide sol containing titanium oxide containing brookite-type crystals is preferred. So long as the titanium oxide sol contains brookite-type crystals, the titanium oxide sol may contain brookite-type titanium oxide singly, or the titanium oxide sol may contain rutile-type titanium oxide and anatase-type titanium oxide. When the titanium oxide sol contains rutile-type titanium oxide and anatase-type titanium oxide, no particular limitation is imposed on the amount of brookite-type titanium oxide contained in the sol. The amount of the brookite-type titanium oxide is typically about 1 to 100 mass %, preferably about 10 to 100 mass %, more preferably about 50 to 100 mass %. In order to enhance dispersibility of titanium oxide particles in a solvent, titanium oxide having a crystalline structure rather than an amorphous structure is preferably employed, since titanium oxide having a crystalline structure tends to remain in the form of primary particles. Particularly, brookite-type titanium oxide is preferred, since it exhibits excellent dispersibility. The reason why brookite-type titanium oxide exhibits excellent dispersibility has not been clarified, but conceivably, high dispersibility of brookite-type titanium oxide relates to brookite-type titanium oxide having a zeta potential higher than that of rutile-type titanium oxide or anatase-type titanium oxide.

Examples of the process for producing titanium oxide particles containing brookite-type crystals include a production process in which anatase-type titanium oxide particles is subjected to heat treatment, to thereby produce titanium oxide particles containing brookite-type crystals; and a liquid-phase production process in which a solution of a titanium compound such as titanium tetrachloride, titanium trichloride, titanium alkoxide, or titanium sulfate is neutralized or hydrolyzed, to thereby produce a titanium oxide sol containing dispersed titanium oxide particles.

When titanium-containing composite oxide particles are produced from titanium oxide particles containing brookite-type crystals, from the viewpoints of small size of the titanium oxide particles and excellent dispersibility of the particles, a preferred process therefor is such that a titanium salt is hydrolyzed in an acidic solution to thereby produce titanium oxide particles in the form of titanium oxide sol. Specifically, the following processes are preferred: a process in which titanium tetrachloride is added to hot water of about 75 to about 100° C., and the titanium tetrachloride is hydrolyzed at a temperature falling within the range of about 75° C. to the boiling point of the solution, while the concentration of chloride ions is controlled, to thereby produce titanium oxide particles containing brookite-type crystals in the form of titanium oxide sol (Japanese Patent Application Laid-Open (kokai) No. 11-043327); and a process in which titanium tetrachloride is added to hot water of about 75 to about 100° C., and, in the presence of either or both of nitrate ions and phosphate ions, the titanium tetrachloride is hydrolyzed at a temperature falling within the range of about 75° C. to the boiling point of the solution, while the total concentration of chloride ions, nitrate ions, and phosphate ions is controlled, to thereby produce titanium oxide particles containing brookite-type crystals in the form of titanium oxide sol (International Patent Publication WO99/58451).

The thus-produced titanium oxide particles containing brookite-type crystals generally have a primary particle size of about 5 to about 50 nm. When the primary particle size exceeds about 50 nm, titanium-containing composite oxide particles produced from the titanium oxide particles have a large particle size, and the composite oxide particles are unsuitable for use as a functional material such as a dielectric material or a piezoelectric material. In contrast, when the primary particle size is less than about 5 nm, difficulty is encountered in handling of the titanium oxide particles during production thereof.

In the production process of the present invention, when a titanium oxide sol obtained through hydrolysis of a titanium salt in an acidic solution is employed, no particular limitation is imposed on the crystal form of titanium oxide particles contained in the sol; i.e., the crystal form of the titanium oxide particles is not limited to brookite-type.

When a titanium salt such as titanium tetrachloride or titanium sulfate is hydrolyzed in an acidic solution, since reaction rate is reduced as compared with the case where hydrolysis is carried out in a neutral or alkaline solution, a titanium oxide sol containing titanium oxide particles having a primary particle size and exhibiting excellent dispersibility is produced. In addition, since anions such as chloride ions and sulfate ions tend not to enter the thus-produced titanium oxide particles, when titanium-containing composite oxide particles are produced from the titanium oxide sol, the amount of anions which enter the composite oxide particles can be reduced.

Meanwhile, when a titanium salt is hydrolyzed in a neutral or alkaline solution, reaction rate increases, and large amounts of nuclei are generated in an early stage. As a result, a titanium oxide sol containing titanium oxide particles of small size but exhibiting poor dispersibility is produced, and the titanium oxide particles form wig-shaped aggregates. When titanium-containing composite oxide particles are formed from such a titanium oxide sol, although the resultant particles have a small particle size, the particles exhibits poor dispersibility. In addition, anions tend to enter the inside of the titanium oxide particles, and removal of the anions in the subsequent step becomes difficult.

No particular limitation is imposed on the process for producing a titanium oxide sol through hydrolysis of a titanium salt in an acidic solution, so long as acidity of the resultant reaction mixture can be maintained. However, preferably, there is carried out a process in which a titanium tetrachloride serving as a raw material is hydrolyzed in a reactor equipped with a reflux condenser, and escape of the thus-generated chlorine from the reactor is suppressed, thereby maintaining acidity of the resultant reaction mixture (Japanese Patent Application Laid-Open (kokai) No. 11-43327).

The concentration of a titanium salt (i.e., a raw material) contained in an acidic solution is preferably about 0.01 to about 5 mol/L. When the concentration exceeds about 5 mol/L, the reaction rate of hydrolysis increases, and thus a titanium oxide sol containing titanium oxide particles of large particle size and exhibiting poor dispersibility is obtained, whereas when the concentration is less than about 0.01 mol/L, the concentration of the resultant titanium oxide decreases, resulting in poor productivity.

The barium compound employed in the production process of the present invention preferably exhibits water-solubility. Typically, the barium compound is, for example, a hydroxide, a nitrate, an acetate, or a chloride. These compounds may be employed singly, or in combination of two or more species by mixing at arbitrary proportions. Specific examples of the barium compound which may be employed include barium hydroxide, barium chloride, barium nitrate, and barium acetate.

The barium titanate of the present invention can be produced through a process in which titanium oxide particles containing brookite-type crystals are reacted with a barium compound; or a process in which a titanium salt is hydrolyzed in an acidic solution, and the resultant titanium oxide sol is reacted with a barium compound.

Preferably, reaction is caused to proceed in an alkaline solution containing a basic compound. The pH of the solution is preferably at least about 11, more preferably at least about 13, much more preferably at least about 14. When the pH of the solution is adjusted to at least about 14, titanium-containing composite oxide particles having smaller particle size can be produced. Preferably, a basic compound (e.g., an organic basic compound) is added to the resultant reaction mixture, to thereby maintain the pH of the mixture at about 11 or more.

No particular limitation is imposed on the basic compound to be added, but preferably, the basic compound is a substance which can be gasified through evaporation, sublimation, and/or thermal decomposition at or below a temperature at which firing is performed and at atmospheric pressure or reduced pressure. Preferred examples of the basic compound which may be employed include TMAH (tetramethylammonium hydroxide) and choline. When an alkali metal hydroxide such as lithium hydroxide, sodium hydroxide, or potassium hydroxide is added, such an alkali metal remains in the resultant titanium-containing composite oxide particles. Therefore, when the composite oxide particles are subjected to molding and sintering, to thereby form a functional material such as a dielectric material or a piezoelectric material, properties of the functional material may be deteriorated. Thus, addition of the aforementioned basic compound (e.g., tetramethylammonium hydroxide) is preferred.

Furthermore, when the concentration of a carbonate group (including carbonate species such as $CO_2$, $H_2CO_3$, $HCO_3^-$, and $CO_3^{2-}$) contained in the reaction mixture is controlled, barium titanate having high c/a can be produced reliably. The concentration of a carbonate group contained in the reaction mixture (as reduced to $CO_2$, hereinafter the same shall apply unless otherwise specified) is preferably about 500 mass ppm or less, more preferably about 1 to about 200 mass ppm, much more preferably about 1 to about 100 mass ppm. When the concentration of a carbonate group falls outside this range, barium titanate having high c/a may fail to be produced.

In the reaction mixture, preferably, the concentration of titanium oxide particles or a titanium oxide sol is regulated to about 0.1 to about 5 mol/L, and the concentration of a barium-containing metallic salt as reduced to a metal oxide is regulated to about 0.1 to about 5 mol/L. In addition, a compound of at least one element selected from the group consisting of Sn, Zr, Ca, Sr, Pb, La, Ce, Mg, Bi, Ni, Al, Si, Zn, B, Nb, W, Mn, Fe, Cu, and Dy may be added to the reaction mixture such that the resultant barium titanate contains such an element in an amount of less than about 5 mol % on the basis of the entirety of $BaTiO_3$. When, for example, a capacitor is produced from the barium titanate, the type and amount of the element added to the reaction mixture may be determined in accordance with intended characteristics (including temperature characteristics) of the capacitor.

While being stirred, at ambient pressure, the thus-prepared alkaline solution is typically heated to about 40° C. to the boiling point of the solution, preferably about 80° C. to the boiling point of the solution, to thereby allow reaction to proceed. The reaction time is typically at least about one hour, preferably at least about four hours.

In general, a slurry obtained through the reaction is subjected to a process employing, for example, electrodialysis, ion exchange, washing with water, washing with acid, or permeation membrane, to thereby remove impurity ions. However, while the impurity ions are removed, barium contained in the resultant barium titanate is ionized and partially dissolved in the slurry, and thus compositional proportions of the barium titanate are unsatisfactory regulated to desired proportions. In addition, since crystal defects are generated in the barium titanate, the c/a ratio of the barium titanate is reduced. Therefore, preferably, removal of impurities such as a basic compound is carried out through the below-described process rather than the aforementioned process.

When a slurry produced through the above-described reaction is subjected to firing, the particles of the present invention can be produced. Through firing of the slurry, crystallinity of titanium-containing composite oxide particles can be enhanced, and impurities remaining in the slurry, such as anions (e.g., chloride ions, sulfate ions, and phosphate ions) and a basic compound (e.g., tetramethylammonium hydroxide), can be removed in the form of gas through evaporation, sublimation, and/or thermal decomposition. Typically, firing is carried out at about 300 to about 1,200° C. No particular limitation is imposed on the firing atmosphere, but typically, firing is carried out in air.

If desired, from the viewpoint of handing, the slurry may be subjected to solid-liquid separation before firing. The solid-liquid separation process includes the steps of precipitation, concentration, filtration, and/or drying. When the steps of precipitation, concentration, and filtration are carried out, a flocculant or a dispersant may be employed in order to increase (or decrease) the precipitation rate or the filtration rate. In a drying step, liquid components are evaporated or sublimated through, for example, reduced-pressure drying, hot-air drying, or freeze-drying.

Before firing of the slurry, impurities such as a basic compound may be removed in the form of gas from the slurry at a temperature falling within a range of room temperature to a temperature at which firing is performed and at atmospheric or reduced pressure.

The thus-produced barium titanate exhibits excellent electric characteristics, in which the BET specific surface area x (unit: $m^2/g$), and the ratio y of the c-axis length (unit: nm) of a crystal unit lattice to the a-axis length (unit: nm) of the crystal unit lattice as measured by means of a Rietveld method satisfy the following relations:

y=c-axis length/a-axis length $y \geq 1.011 - 8.8 \times 10^{-6} \times x^3$ (wherein x is greater than about 0.1 and not more than 9.7)

$y \geq 1.003$ (x>9.7).

EXAMPLES

The present invention will next be described in detail by way of Examples, which should not be construed as limiting the invention thereto.

Example 1

An aqueous solution containing 0.25 mol/L titanium tetrachloride (product of Sumitomo Sitix, purity: 99.9%) was placed in a reactor equipped with a reflux condenser, and the solution was heated to a temperature near its boiling point, while escape of chloride ions was suppressed, whereby acidity of the solution was maintained. The solution was maintained at the temperature for 60 minutes, and the titanium tetrachloride was hydrolyzed, to thereby yield a titanium oxide sol. A portion of the thus-obtained titanium oxide sol was dried at 110° C., and the titanium oxide was subjected to crystallographic analysis by use of an X-ray diffraction apparatus (RAD-B Rotor Flex, product of Rigaku Corporation). As a result, the titanium oxide was found to be brookite-type titanium dioxide.

Barium hydroxide octahydrate (product of Barium Chemicals Co., Ltd.) (126 g), and an aqueous solution (456 g)—which had been prepared by feeding carbon dioxide gas to a 20 mass % aqueous solution of tetramethylammonium hydroxide (TMAH) (product of Sachem Showa) such that the concentration of a carbonate group contained in the solution became 60 mass ppm (as reduced to $CO_2$, hereinafter the same shall apply unless otherwise specified)—were added to a reactor equipped with a reflux condenser, and the resultant mixture was heated to 95° C. in the reactor while the pH of the mixture was maintained at 14. A titanium oxide sol (titanium oxide concentration: 15 mass %) (213 g) which had been prepared through precipitation and concentration of the above-obtained titanium oxide sol was added dropwise to the reactor at a rate of 7 g/minute.

The resultant mixture was heated to 110° C., and maintained at the temperature under stirring for four hours, to thereby allow reaction to proceed. The thus-produced slurry was left to cool to 50° C., and then the thus-cooled slurry was subjected to filtration. The filter cake was dried at 300° C. for five hours, to thereby produce a fine powder. The actual yield of the powder was found to be 99.8% the theoretical yield calculated from the amounts of the titanium oxide and barium hydroxide employed in the reaction. In order to crystallize the powder, the powder was maintained in air at 880° C. for two hours. In this case, the rate of temperature increase was regulated to 20° C./minute.

The resultant powder was subjected to X-ray diffraction analysis by use of an X-ray diffraction apparatus (RAD-B Rotor Flex, product of Rigaku Corporation). As a result, the powder was found to be perovskite-type $BaTiO_3$. On the basis of X-ray diffraction intensity data, the c/a ratio of the powder was obtained by means of a Rietveld method, and found to be 1.0104. The specific surface area S of the powder was measured by means of a BET method, and found to be 7.1 m$^2$/g. The above-obtained c/a ratio was found be greater than the c/a ratio calculated from the aforementioned formula on the basis of the above-measured surface area; i.e., 1.0079. The amount of a carbonate group contained in the sample (powder) was measured through infrared spectroscopy. The amount of a carbonate group was found to be about 1 mass % as reduced to barium carbonate. The sample was found to exhibit no sharp absorption peak in the vicinity of 3,500 cm$^{-1}$—such an absorption peak is known to appear, like the case of carbonate group, when a hydroxyl group is present in a crystal lattice.

Example 2

A perovskite-type BaTiO$_3$ was produced in a manner similar to that of Example 1. The BaTiO$_3$ was crystallized at 600° C. for two hours. The specific surface area and c/a ratio of the resultant BaTiO$_3$ were measured in a manner similar to that of Example 1, and found to be 25 m$^2$/g and 1.0032, respectively.

Example 3

A perovskite-type BaTiO$_3$ was produced in a manner similar to that of Example 1. The BaTiO$_3$ was crystallized at 950° C. for two hours. The specific surface area and c/a ratio of the resultant BaTiO$_3$ were measured in a manner similar to that of Example 1, and found to be 4.1 m$^2$/g and 1.0106, respectively. The thus-obtained c/a ratio was found to be greater than the c/a ratio calculated from the aforementioned formula; i.e., 1.0104.

Example 4

A perovskite-type BaTiO$_3$ was produced in a manner similar to that of Example 1. The BaTiO$_3$ was crystallized at 1,200° C. for two hours. The specific surface area and c/a ratio of the resultant BaTiO$_3$ were measured in a manner similar to that of Example 1, and found to be 0.5 m$^2$/g and 1.0110, respectively. The thus-obtained c/a ratio was found to be equal to the c/a ratio calculated from the aforementioned formula; i.e., 1.0110.

Example 5

The procedure of Example 1 was repeated, except that the amount of TMAH to be added was reduced and the pH of the alkaline solution was changed to 11, to thereby synthesize a barium titanate. The actual yield of the barium titanate was found to be 98% the theoretical yield. The barium titanate was crystallized at 880° C. for two hours. The specific surface area and c/a ratio of the resultant sample were measured in a manner similar to that of Example 1, and found to be 7.3 m$^2$/g and 1.0102, respectively. The thus-obtained c/a ratio was found to be greater than the c/a ratio calculated from the aforementioned formula; i.e., 1.0076.

Example 6

The procedure of Example 1 was repeated, except that a choline aqueous solution having a carbonate group content of 75 mass ppm was employed in place of the TMAH aqueous solution, to thereby synthesize a barium titanate. The actual yield of the barium titanate was found to be 99.9% the theoretical yield. The barium titanate was crystallized at 880° C. for two hours. The specific surface area and c/a ratio of the resultant sample were measured in a manner similar to that of Example 1, and found to be 7 m$^2$/g and 1.0103, respectively. The thus-obtained c/a ratio was found to be greater than the c/a ratio calculated from the aforementioned formula; i.e., 1.0080.

Example 7

The procedure of Example 1 was repeated, except that a commercially available anatase-type titanium oxide sol (STS-02, product of Ishihara Sangyo Kaisya Ltd.) was employed in place of the brookite-type titanium oxide sol synthesized in Example 1, to thereby synthesize a barium titanate. The actual yield of the barium titanate was found to be 99.8% the theoretical yield. The barium titanate was crystallized at 880° C. for two hours. The specific surface area and c/a ratio of the resultant sample were measured in a manner similar to that of Example 1, and found to be 7.7 m$^2$/g and 1.0071, respectively. The thus-obtained c/a ratio was found to be greater than the c/a ratio calculated from the aforementioned formula; i.e., 1.0070.

Example 8

The procedure of Example 1 was repeated, except that a TMAH having a carbonate group content of 110 mass ppm was employed in place of the TMAH having a carbonate group content of 60 mass ppm, to thereby synthesize a barium titanate. The actual yield of the barium titanate was found to be 99.8% the theoretical yield. The barium titanate was crystallized at 880° C. for two hours. The specific surface area and c/a ratio of the resultant sample were measured in a manner similar to that of Example 1, and found to be 7.3 m$^2$/g and 1.0099, respectively. The thus-obtained c/a ratio was found to be greater than the c/a ratio calculated from the aforementioned formula; i.e., 1.0076.

Example 9

The procedure of Example 1 was repeated, except that a TMAH having a carbonate group content of 215 mass ppm was employed in place of the TMAH having a carbonate group content of 60 mass ppm, to thereby synthesize a barium titanate. The actual yield of the barium titanate was found to be 99.7% the theoretical yield. The barium titanate was crystallized at 880° C. for two hours. The specific surface area and c/a ratio of the resultant sample were measured in a manner similar to that of Example 1, and found to be 7.5 m$^2$/g and 1.0092, respectively. The thus-obtained c/a ratio was found to be greater than the c/a ratio calculated from the aforementioned formula; i.e., 1.0073.

Example 10

The procedure of Example 1 was repeated, except that a TMAH having a carbonate group content of 490 mass ppm was employed in place of the TMAH having a carbonate group content of 60 mass ppm, to thereby synthesize a barium titanate. The actual yield of the barium titanate was found to be 99.4% the theoretical yield. The barium titanate was crystallized at 880° C. for two hours. The specific surface area and c/a ratio of the resultant sample were measured in a manner similar to that of Example 1, and found to be 8.1 m$^2$/g and 1.0065, respectively. The thus-obtained c/a ratio was found to be greater than the c/a ratio calculated from the aforementioned formula; i.e., 1.0063.

Example 11

The procedure of Example 1 was repeated, except that a commercially available anatase-type titanium oxide sol (ST-02, product of Ishihara Sangyo Co., Ltd.) was employed in place of the brookite-type titanium oxide sol synthesized in Example 1, to thereby synthesize a barium titanate. The actual yield of the barium titanate was found to be 99.8% the theoretical yield. The barium titanate was crystallized at 880° C. for two hours. The specific surface area and c/a ratio of the resultant sample were measured in a manner similar to that of Example 1, and found to be 7.7 m$^2$/g and 1.0071, respectively. The thus-obtained c/a ratio was found to be greater than the c/a ratio calculated from the aforementioned formula; i.e., 1.0070.

Comparative Example 1

An oxalic acid aqueous solution was heated to 80° C. under stirring, and an aqueous solution of a mixture of $BaCl_2$ and $TiCl_4$ was added dropwise to the oxalic acid aqueous solution, to thereby yield barium titanyl oxalate. The thus-obtained sample was washed with water for removing chlorine therefrom, and subsequently the sample was thermally decomposed at 950° C., to thereby produce $BaTiO_3$. The specific surface area and c/a ratio of the resultant $BaTiO_3$ were measured in a manner similar to that of Example 1, and found to be 4 m$^2$/g and 1.0088, respectively. The thus-obtained c/a ratio was found to be smaller than the c/a ratio calculated from the aforementioned formula; i.e., 1.0104. The amount of a carbonate group contained in the sample ($BaTiO_3$) was measured by use of an infrared spectrometer, and as a result, the amount of a carbonate group was found to be 8 mass % as reduced to barium carbonate. Since a large amount of a carbonate group (i.e., an impurity) is generated in the $BaTiO_3$, conceivably, the $BaTiO_3$ has a low tetragonality content; i.e., dielectric characteristics of the $BaTiO_3$ serving as a dielectric material are unsatisfactory.

Comparative Example 2

The brookite-type titanium oxide sol synthesized in Example 1 (667 g), barium hydroxide octahydrate (592 g) (Ba/Ti mol ratio: 1.5), and ion exchange water (1 L) were placed in a 3-L autoclave, and the resultant mixture was subjected to hydrothermal treatment under saturation vapor pressure at 150° C. for one hour. The resultant sample was washed with water for removing excess barium therefrom, and the sample was crystallized at 800° C. for two hours. The specific surface area and c/a ratio of the resultant sample were measured in a manner similar to that of Example 1, and found to be 6.9 m$^2$/g and 1.0033, respectively. The thus-obtained c/a ratio was found to be smaller than the c/a ratio calculated from the aforementioned formula; i.e., 1.0081. The sample was evaluated by use of an infrared spectrometer, and found to exhibit a steep absorption peak in the vicinity of 3,500 cm$^{-1}$ corresponding to a hydroxyl group contained in a crystal lattice. Conceivably, when barium titanate is produced through a hydrothermal synthesis method, since a hydroxyl group enters a crystal lattice, the resultant barium titanate has a low tetragonality content.

Comparative Example 3

A perovskite-type $BaTiO_3$ fine powder was produced in a manner similar to that of Example 1. The powder was crystallized at 300° C. for two hours. The specific surface area and c/a ratio of the resultant powder were measured in a manner similar to that of Example 1, and found to be 45 m$^2$/g and 1.0000, respectively.

Comparative Example 4

The procedure of Example 1 was repeated, except that TMAH was not added, to thereby synthesize a barium titanate. In this case, the pH of the alkaline solution became 10.2. The actual yield of the powder was found to be 86% the theoretical yield. The results show that when the pH of the alkaline solution is lowered, the yield of a barium titanate decreases to a non-practical level.

Comparative Example 5

The procedure of Example 1 was repeated, except that KOH was employed in place of TMAH, to thereby synthesize a barium titanate. The actual yield of the barium titanate was found to be 99.9% the theoretical yield. The barium titanate was subjected to filtration, and the resultant sample was washed with water until the K content became 100 ppm. The sample was crystallized at 800° C. for two hours. The specific surface area and c/a ratio of the resultant sample were measured in a manner similar to that of Example 1, and found to be 9 m$^2$/g and 1.0030, respectively. The thus-obtained c/a ratio was found to be smaller than the c/a ratio calculated from the aforementioned formula; i.e., 1.0046. The sample was evaluated by use of an infrared spectrometer, and found to exhibit a steep absorption peak in the vicinity of 3,500 cm$^{-1}$ corresponding to a hydroxyl group contained in a crystal lattice. Furthermore, the Ba/Ti mol ratio was found to have decreased 0.007 from that before washing of the sample; i.e., Ba, along with K, was eluted through washing of the sample.

Comparative Example 6

The procedure of Example 1 was repeated, except that a TMAH having a carbonate group content of 1,000 mass ppm was employed in place of the TMAH having a carbonate group content of 60 mass ppm, to thereby synthesize a barium titanate. The actual yield of the barium titanate was found to be 99.4% the theoretical yield. The barium titanate was crystallized at 880° C. for two hours. The specific surface area and c/a ratio of the resultant sample were measured in a manner similar to that of Example 1, and found to be 8.3 m$^2$/g and 1.0058, respectively. The thus-obtained c/a ratio was found to be smaller than the c/a ratio calculated from the aforementioned formula; i.e., 1.0060.

INDUSTRIAL APPLICABILITY

A barium titanate in which the BET specific surface area x (unit: m$^2$/g), and the ratio y of the c-axis length (unit: nm) of a crystal unit lattice to the a-axis length (unit: nm) of the crystal unit lattice as measured by means of a Rietveld method satisfy the following relations:

y=c-axis length/a-axis length $y \geq 1.011 - 8.8 \times 10^{-6} \times x^3$ (wherein x is greater than about 0.1 and not more than 9.7)

$y \geq 1.003$ (x>9.7)

has a small particle size, has a high electric constant, and exhibits excellent electric characteristics. Therefore, a small-sized electronic part such as a multi-layer ceramic capacitor can be produced from a dielectric material containing the barium titanate, such as a dielectric ceramic material. Furthermore, an electronic apparatus of small size and light weight can be produced from such an electronic part.

The invention claimed is:

1. A barium titanate comprising at least one element selected from the group consisting of Sn, Zr, Ca, Sr, Pb, La, Ce, Mg, Bi, Ni, Al, Si, Zn, B, Nb, W, Mn, Fe, Cu, and Dy, said at least one element being in an amount of less than about 5 mol %, inclusive of 0 mol %, on the basis of the entirety of BaTiO3, wherein BET specific surface area x, unit: $m^2/g$, and the ratio y of the c-axis length, unit: nm, of a crystal unit lattice to the a-axis length, unit: nm, of the crystal unit lattice as measured by means of a Rietveld method satisfy one of the following two relations (1) and (2):

(1) $y \geq 1.01-(8.8)(10^{-6})(x^3)$, wherein x is greater than about 0.1 and not more than 9.7

(2) $y \geq 1.003$ and $x>9.7$.

2. A barium titanate according to claim 1, which is in the form of powder.

3. A process for producing a barium titanate as recited in claim 1, comprising reacting a titanium oxide sol with a barium compound in an alkaline solution containing a basic compound, the process comprising a step of reacting the titanium oxide sol with the barium compound while the concentration of a carbonate group contained in the resultant reaction mixture is maintained at about 500 mass ppm or less as reduced to $CO_2$; a step of removing the basic compound in the form of gas after completion of reaction; and a step of firing the resultant reaction mixture.

4. A process for producing a barium titanate according to claim 3, wherein the titanium oxide sol is produced through hydrolysis of a titanium compound under acidic conditions.

5. A process for producing a barium titanate according to claim 3, wherein the titanium oxide sol contains brookite-type crystals.

6. A process for producing a barium titanate according to claim 3, wherein the basic compound is a substance which can be gasified through evaporation, sublimation, and/or thermal decomposition at a temperature at which firing is performed or lower and at atmospheric pressure or reduced pressure.

7. A process for producing a barium titanate according to claim 6, wherein the basic compound is an organic base.

8. A process for producing a barium titanate according to claim 3, wherein the alkaline solution has a pH of at least about 11.

9. A process for producing a barium titanate according to claim 3, wherein the step of removing the basic compound in the form of gas is carried out at a temperature falling within a range of room temperature to a temperature at which firing is performed and at atmospheric pressure or reduced pressure.

10. A process for producing a barium titanate according to claim 3, wherein the firing step includes the step of removing the basic compound in the form of gas.

11. A process for producing a barium titanate according to claim 3, wherein the firing step is carried out at about 300 to about 1,200° C.

12. A process for producing a barium titanate according to claim 3, wherein the reaction mixture of the titanium oxide sol and the barium compound contains a compound of at least one element selected from the group consisting of Sn, Zr, Ca, Sr, Pb, La, Ce, Mg, Bi, Ni, Al, Si, Zn, B, Nb, W, Mn, Fe, Cu, and Dy.

13. A dielectric ceramic comprising a barium titanate as recited in claim 1.

14. A dielectric ceramic comprising a barium titanate as recited in claim 2.

15. A capacitor comprising a dielectric ceramic as recited in claim 13.

16. A capacitor comprising a dielectric ceramic as recited in claim 14.

* * * * *